United States Patent [19]

Krupke

[11] 4,004,250
[45] Jan. 18, 1977

[54] LASER ACTION BY OPTICALLY DEPUMPING LOWER STATES

[75] Inventor: William F. Krupke, Pleasanton, Calif.

[73] Assignee: The United States of America as represented by the United States Energy Research and Development Administration, Washington, D.C.

[22] Filed: Nov. 26, 1975

[21] Appl. No.: 635,456

[52] U.S. Cl. .................. 331/94.5 PE; 331/94.5 G; 330/4.3

[51] Int. Cl.² ...................... H01S 3/09; H01S 3/22

[58] Field of Search .................... 331/94.5; 330/4.3

[56] References Cited

UNITED STATES PATENTS

| | | | |
|---|---|---|---|
| 3,333,101 | 7/1967 | Bell | 331/94.5 P |
| 3,588,740 | 6/1971 | Bell | 331/94.5 PE |

Primary Examiner—Robert J. Webster
Attorney, Agent, or Firm—Dean E. Carlson; Roger S. Gaither; L. E. Carnahan

[57] ABSTRACT

A method and apparatus for obtaining laser action between an upper energy level and a lower energy level of a gaseous medium, which comprises populating the upper energy level to some degree (short of achieving a conventional inverted population) by any suitable pumping means, and thereafter establishing an inverted population by transiently and selectively depumping the lower energy level such as by exposing the medium to an intense source of radiation which selectively causes the transformation of the lower energy level species to some other energy level. Thus, a thermally pumped/optically depumped gas laser system is produced.

9 Claims, 6 Drawing Figures

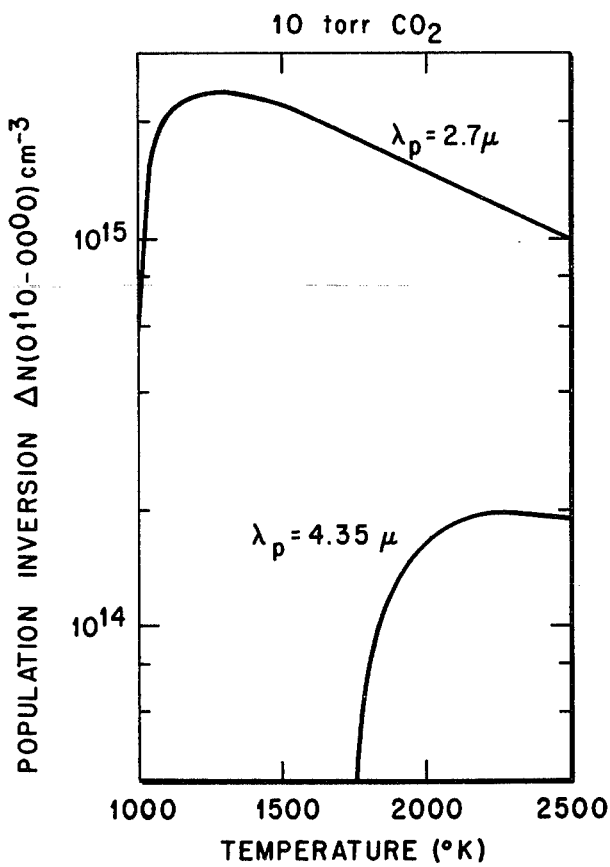
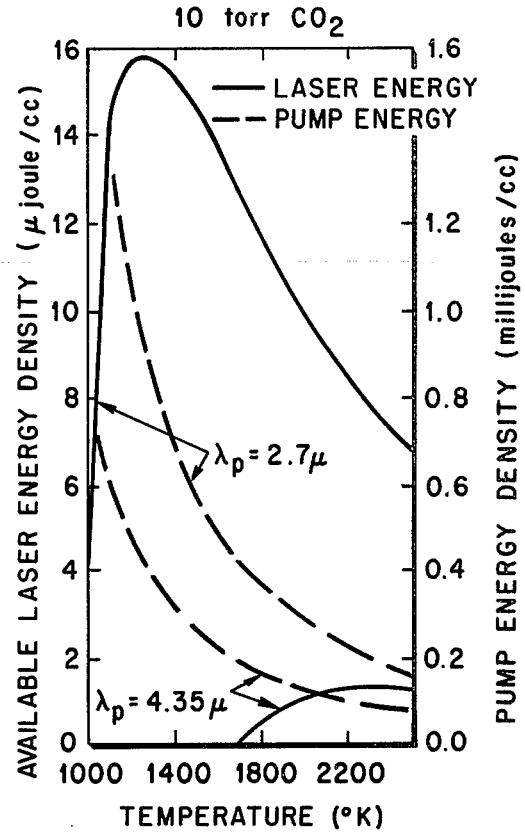
Fig. 3
Fig. 4
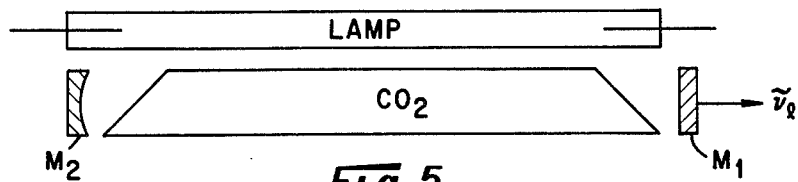
Fig. 5
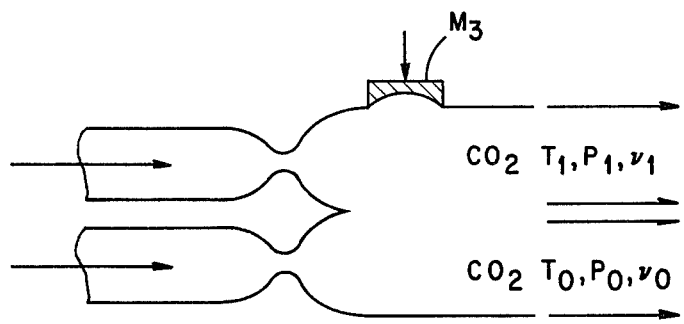
Fig. 6

LASER ACTION BY OPTICALLY DEPUMPING LOWER STATES

The invention described herein was made in the course of, or under, Contract No. W-7405-Eng-48, with the United States Energy Research and Development Administration.

BACKGROUND OF THE INVENTION

This invention is directed to laser systems, particularly to a thermally pumped/optically depumped gas laser systems, and more particularly to a fundamentally different method for obtaining laser action between an upper energy level and a lower energy level of a gaseous lasing medium by optically depumping the lower energy level.

An essential condition for laser action is an inverted population between an upper and a lower energy level in a lasing medium. The traditional method of obtaining such a population inversion is to "pump" the medium into the upper energy level; i.e., by exposing it to some kind of energy source (flash lamps, electron beams, electrical discharge, etc.) which excite the lasing species in the ground state so as to reach the upper energy or laser level.

A generic laser initiated technique for the photoseparation of heavy isotopes requires the selective excitation of a vibrational level of the working molecular gas. The relevant vibrational modes often lie in the mid infrared spectral region beyond ten microns where powerful tunable lasers do not exist. At the present time there is particular interest in developing powerful, and tunable lasers operating between 10 and 30 microns, a region moderately inaccessible by current technology. For example, a need exists for a reasonance (isotopic) laser at long wavelength, such as 16 microns, for $UF_6$ or $SF_6$, using $CO_2$ as the lasing medium. Since conventional "pumping" techniques affect each of the energy levels proportionally, a need exists for more effective methods of creating the desired population inversion in the desired energy level.

SUMMARY OF THE INVENTION

The present invention is fundamentally different than previously known pumping methods for gaseous lasing medium, in that the population inversion is obtained by diminishing the concentration of species in the lower energy level, rather than increasing the upper energy level population. This, of course, presupposes the presence of a useful population in the upper level at the time of depumping the lower level, whereby laser action can be obtained between the upper and lower levels.

Therefore, the present invention comprises a technique for the generation of coherent radiation in the low-lying vibrational-rotational transitions of polyatomic molecules. The carbon dioxide molecule is used herein as a specific model to illustrate the method because sufficient information is known for the $CO_2$ molecule to permit estimates of laser performance. However, the technique of producing a population inversion among the low-lying vibrational levels of molecules is quite general and other molecules of interest will be suggested hereinafter. The system of this invention is not sensitive to the kinds of means employed to populate the upper level or depopulate the lower one, and this has general application as to conventional lasing medium and means for accomplishing the pumping and depumping. However, a specifically preferred system is one wherein the mediums involved are polar molecular species and the energy levels are the vibrational states close to the ground state. In such systems, these low-lying vibrational states can be populated to a useful degree by simply elevating the temperature of the medium. Thereafter a transient population inversion is produced by rapidly pumping the molecules in the ground state to a higher energy level. Lasing is achieved by carrying out this process in a cavity resonant with respect to the desired laser transition, for example 16 microns. Thus, the invention encompasses a thermally pumped/optically depumped laser and is particularly directed to a 16 micron $CO_2$ laser, although other mediums and wavelengths can be utilized by this principle.

Therefore, it is an object of this invention to provide a method and apparatus for achieving laser action by optically depumping lower states of the lasing medium.

A further object of the invention is to provide a thermally pumped/optically depumped laser system.

Another object of the invention is to provide a method for obtaining laser action in a gaseous medium by diminishing the concentration of species in the lower energy level of a medium having a useful population in the upper energy level at the time of depumping the lower level.

Another object of the invention is to obtain laser action between an upper energy level and a lower energy level of a gaseous medium by populating to a degree the upper level and thereafter establishing an inverted population by transiently and selectively depumping the lower level.

Another object of the invention is to provide a thermally pumped/optically depumped 16 micron $CO_2$ laser system.

Other objects of the invention will become readily apparent from the following description and accompanying drawings.

BRIEF DESCRIPTION OF THE DRAWINGS

FIG. 3 graphically shows the population inversion density as a function of temperature for two cases;

FIG. 4 graphically shows the available energy density and required pump energy density as functions of temperature for the two cases;

FIG. 5 schematically illustrates a flash lamp pumped $CO_2$ laser system for carrying out the invention; and FIG. 6 schematically illustrates a parallel nozzle gas dynamic laser system for carrying out the invention.

DESCRIPTION OF THE INVENTION

In its broad aspects, the present invention involves a new method or technique for obtaining laser action between an upper energy level and a lower energy level of a gaseous medium. This method is fundamentally different, in that the population inversion is obtained by diminishing the concentration of species in the lower level, rather than increasing the upper level population as is done in conventional systems. The method is carried out by populating the upper level to some degree (short of achieving a conventional inverted population) by any suitable pumping means, and thereafter establishing an inverted population by transiently and selectively depumping the lower level, such as by exposing the medium to an intense source of radiation, which selectively causes the transformation of said lower level species to some other energy level. This method is not sensitive to the kinds of means employed to populate the upper level or depopulate the lower one. However, a preferred system utilizes a gaseous medium having polar molecular species and the energy levels are the vibrational states close to the ground state. In such systems, these low-lying vibrational states can be populated to a useful degree by simply elevating the temperature of the medium. Thereafter a transient population inversion is produced by rapidly pumping the molecules in the ground state to a higher energy level. Lasing is achieved by carrying out this process in a cavity resonant with respect to the desired laser transition. While not limited to the wavelength or medium the following description is directed to a 16 micron $CO_2$ laser system. Another example is $SF_6$ or $UF_6$ as the gaseous medium wherein the lower level can be depumped with a $CO_2$ laser.

By employing a thermal source to put population density in an upper energy or laser of a gaseous medium, such as $CO_2$, $SF_6$ or $UF_6$, and an optical (incoherent) source to transiently depump the lower laser (ground) level, an (isotopic) resonance laser at long wavelength, such as 16 microns, can be accomplished. It is also possible using this concept to attain continuous wave (CW) coherent radiation using a flowing working medium.

Figure 1:
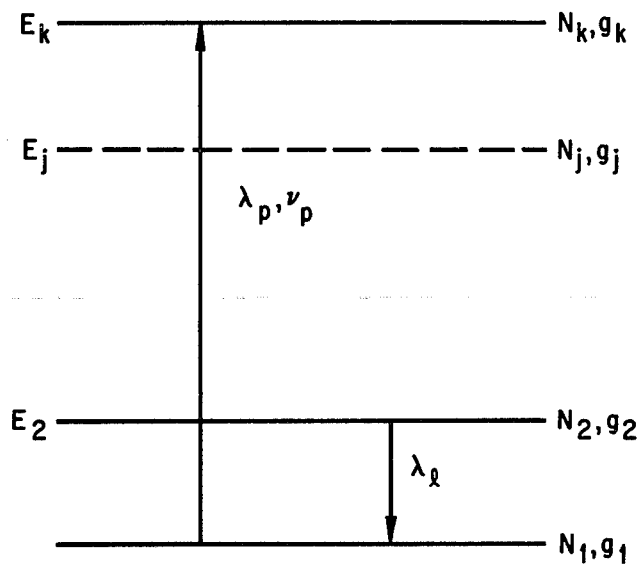
FIG. 1 diagrammatically shows the relevant low-lying vibrational levels of a "typical" polyatomic molecule.

FIG. 1 shows the relevant low-lying vibrational levels to a "typical" polyatomic molecule with the $g$-values giving the vibrational degeneracies of the respective level. Level 1 is the vibrationless ground level, level 2 is the lowest-lying vibrational level connected to the ground level by an "allowed" electric dipole transition, and level $k$ is some higher lying vibrational level also connected to the ground level by an electric dipole transition. Level $j$ represents all other vibrational levels of the molecule. The following is set forth to illustrate how to create a transient population inversion between vibrational energy level 2 and the vibrationless ground level 1, providing for net gain at a photon energy $E_1$ (or wavelength $\lambda_l = hc/E_1$). A population inversion, $\Delta N$, between these two levels can be expressed as $$\Delta N = \frac{N_2^f}{g_2} - \frac{N_1^f}{g_1} \qquad (1)$$

where the $f$-superscript indicates the pumped, nonequilibrium condition.

The generic technique to achieve this condition is as follows. Start with a working gas sample at some equilibrium pressure $P^0$ and temperature $T^0$ ($N_T$ molecules/cc.). The molecules will be distributed among all of the vibrational and rotational modes (levels) of the molecule according to a Boltzman distribution. As the temperature is raised, level 2 gains population at the expense of level 1, as expressed by $$N_2^o = \frac{g_2}{g_1} N_1^o \exp\left|-1.44\, E_2/T\right| \qquad (2)$$

where energy, E, is expressed in $cm^{-1}$ and T in °K and the superscript "o" indicates initial, thermodynamic equilibrium conditions. To achieve the population condition expressed by Eq. (1), we can act on the gas, either by putting more molecules into level 2, or removing molecules from level 1, in a time short compared with the time for the system to return to equilibrium. The following utilizes the latter option. It is proposed to depump the lower (ground) laser level (1) by irradiation of the gas sample at wavelengths corresponding to the transition $\nu_p$ shown in FIG. 1. The initial (equilibrium) population of level $k$ is given by $$N_k^o = \frac{g_k}{g_1} N_1^o \exp\left(-1.44\, E_k/T\right) \qquad (3)$$

The equilibrium population density of $N_1^o\,(T)$ depends on the temperature T and is given by $$N_T = N_1^o(T) \left\{ 1 + \frac{g_2}{g_1} \exp(-1.44\, E_2/T) + \sum_j \frac{g_j}{g_1} \exp(-1.44\, E_j/T) \right\} \qquad (4)$$

where the sum $-j$ is over all vibrational levels besides levels 1 and 2. Upon application of a saturating pulse of radiation at frequency $\nu_p$, the populations of levels $j$ and $k$ will be modified to maximum "depumped" values $N_1^f$ and $N_k^f$ given by $$N_1^f = \frac{1}{g_k + 1}\left\{ N_1^o + N_k^o \right\} \qquad (5)$$

and $$N_k^f = g_k\, N_1^f = \frac{g_k}{g_k + 1}\left\{ N_1^o + N_k^o \right\} \qquad (6)$$

where we have taken $g_l = 1$ appropriate for vibrationless ground levels. If the depumping pulse of radiation is sufficiently fast (see below) the initial and final values of level 2 populations will be the same $$N_2^f = N_2^o \qquad (7)$$

Combining equations (2) – (7), we can write the induced population inversion density $\Delta N$ as $$\Delta N(T) = N_1^o(T) \left\{ \exp(-1.44\, E_2/T) - \frac{1}{g_k + 1} [1 + g_k \exp(-1.44\, E_k/T)] \right\} \qquad (8)$$

From Eq. (8), we observe that a population inversion density $\Delta N$ 0 will exist above some temperature $T_{min}$, (when the quantity within the bracket exceeds zero) where $T_{min}$ is defined by $$\exp(-1.44\, E_2/T_{min}) = \frac{1}{g_k + 1}\left\{1 + g_k \exp(-1.44\, E_k/T_{min})\right\} \quad (9)$$

This transcendental equation cannot be directly solved for $T_{min}$, but in the limit when $E_k >> T_{min}$, Eq. (9) reduces to $$\exp(-1.44\, E_2/T_{min}) = \frac{1}{g_k + 1} \quad (10)$$

so that $$T_{min} = \frac{1.44\, E_2}{\ln(g_k + 1)} \quad (11)$$

Obviously, a high value for $g_k$ is desirable since it can reduce $T_{min}$ significantly. Expansion of Eq. (9) for large temperatures also shows that a population inversion can always be induced at some temperature provided $E_k$ and $E_2$ satisfy the inequality $$\frac{g_k}{g_k + 1} E_k > E_2 \quad (12)$$

which for the worst case ($g_k=1$) requires $E_k=2E_2$. However, since $N_1^o(T) \rightarrow 0$ as $T \rightarrow \infty$, the population inversion density $\Delta N(T)$ may not be significantly large for high values of T. The number of pump photon absorbed per unit volume to achieve maximum depumping of the ground level is $$N_k{}^f - N_k{}^o = \frac{g_k\, N_1^o}{g_k + 1}\left[1 - \exp(-1.44\, E_k/T)\right] \quad (13)$$

and the pump energy absorbed per unit volume is $$S_{pump} = \frac{hc}{\lambda_p} N_1^o(T)\left(\frac{g_k}{g_k + 1}\right)\left[1 - \exp(-1.44\, E_k/T)\right] \quad (14)$$

Similarly, the maximum available stored energy density for this (essentially) two-level laser system is $$E_l = \frac{1}{2} \Delta N = \frac{N_1^o(T)}{2}\left(\frac{hc}{\lambda_l}\right)$$

$$\left\{\exp(-1.44\, E_2/T) - \frac{1}{(g_k + 1)}\left[1 + g_k \exp(-1.44\, E_k/T)\right]\right\} \quad (15)$$

Figure 2:
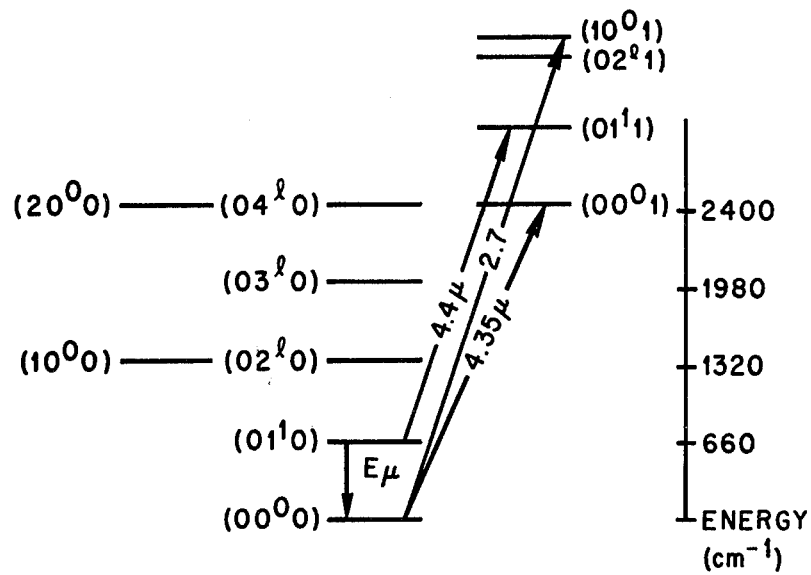
FIG. 2 diagrammatically illustrates the low-lying $CO_2$ vibrational levels.

As an example of the "thermally-pumped, optically-depumped" laser technique, consider the $CO_2$ molecule. The low-lying $CO_2$ vibration levels are shown in FIG. 2. The lowest-lying vibrational level is that of the fundamental bending mode, $(01^10)$ which is coupled to the ground level by a large electric dipole transition centered at a wavelength $\lambda_l = 15.0$ microns ($\bar{\nu}_l = 667$ cm$^{-1}$). We consider two specific depumping cases for inverting the $(01^10)$ level with respect to the $(00^00)$ ground level. Case I, pumping in the 4.35 $\mu$ fundamental band $(00^00) \rightarrow (00^01)$ to the singly degenerate $(00^01)$ asymmetric stretching mode. Case II, pumping in the 2.7 $\mu$ combination bands $(00^00) \rightarrow (10^01)(-02^01)$, with an effective degeneracy of $g_k = 2$. We assume an operating pressure of 10 torr $CO_2$ for all temperatures and calculate $N_1^o(T)$, $\Delta N(T)$, $S_p$, and $E_l$ for Case I ($g_k = 1$, $E_k = 2349$ cm$^{-1}$), and Case II ($g_k = 2$, $E_k = 3650$ cm$^{-1}$). FIG. 3 shows the population inversion density as a function of temperature for the two cases and FIG. 4 shows the available energy density and required pump energy density as functions of temperature for both cases. Note the relatively larger inversion density and available laser energy density occurring at lower temperature in Case II, due primarily to the greater pump level degeneracy ($g_k = 2$). Taking the calculated inversion densities, the measured electric dipole transition moment for the $00^00 \rightarrow 01^10$ transition (R = 0.18 Debye), and the expressions for vibrational-rotational linestrengths given by Rademacker and Reiche, Zeit f. Phys. K, 41,453 (1927) and by Crawford and Dinsmore J. Chem. Phys. 18, 983 (1950), estimates for the small signal gains of the P, Q, and R branch transitions can be made. Detailed calculations will not be presented here; peak P-branch calculated gains are several percent per cm and appear to be adequate for operation of laser devices.

The characteristic time, $t_p$, required for the pump energy to be delivered to attain population inversion is determined by the vibrational, rotational, and translational kinetics. Upon pump irradiation, all of the excited vibrational energy levels will be out of thermodynamic equilibrium. In the case of $CO_2$, the $01^10$ bending mode may return to equilibrium through collisions of the type:

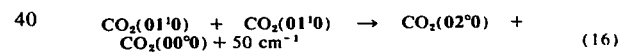

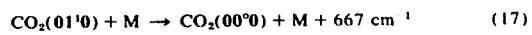

Typical rates for the V-V (Vibration-Vibration) processes (Eq. 16), are $10^6$ sec$^{-1}$ torr$^{-1}$; the V-T (Vibration-Translation) deactivation rate for $\nu_2$ of $CO_2$ at 1000° K is $1.6 \times 10^3$ sec$^{-1}$ torr$^{-1}$. It therefore appears that V-V processes will constrain the pumping pulse width to values less than one $\mu$sec for pressures of a torr or greater. The pump source in the example of $CO_2$ can be HBr laser (Case I) which has been used to pump the $(00^00) \rightarrow (00^01)$ transition in $CO_2$ and in $N_2O$, see Chang et al, Appl. Phys. Letters 21, 19 (1972); 23, 370 (1973); and 22, 93 (1973). The HF laser with emission wavelengths near 2.7 $\mu$ may be useful for pumping $CO_2$ in Case II. FIG. 5 schematically illustrates an optical resonator for containing the gaseous medium and a flashlamp type pump source therefore operating at frequency $\approx_l(\lambda_l = 16\mu)$, as indicated by the arrow. However, the flashlamp can be replaced by another type of an intense spectral source.

It has been assumed here that the pump intensity is sufficient to saturate the pump transition and that the pump does not drive overtone transitions. If this occurs, the maximum inversion densities calculated above may be increased further. Radiation transport and V-V kinetics must be examined for each molecule and pump source to establish attainable population inversion densities, output energies, and optimum laser/pump geometries.

Table I lists a number of simple polyatomic molecules which may be used for infrared lasers based on the thermally-pumped, optically inverted molecular lasers of this invention. The energies and wavelengths given under the heading "Laser Band" correspond to the lower lying, infrared active transitions of the molecules listed in the left hand column. Only mean transition wavelengths are listed in lieu of all possible P, Q, and R vibration-rotational transition wavelengths. Isotopically substituted working species can greatly extend the number of attainable transition wavelengths. Possible pump transitions are listed under the heading "Pump Band" together with an indication of the transition strength, $R(\nu\nu^1)$.

TABLE 1

| MOLECULE | LASER BAND | | | PUMP BAND | | | |
|---|---|---|---|---|---|---|---|
| | $E(cm^{-1})$ | $\lambda(\mu)$ | Mode | $E(cm^{-1})$ | $\lambda(\mu)$ | Mode | $R(\nu\nu^1)$ |
| $SO_2$ | 519 | 19.3 | $\nu_2$ | 1151.2 | 8.69 | $\nu_1$ | Strong |
| | | | | 1361. | 7.35 | $\nu_3$ | Strong |
| | | | | 1871. | 5.34 | $\nu_2+\nu_3$ | Medium |
| $CO_2$ | 667.3 | 15.0 | $\nu_2$ | 2349.3 | 4.26 | $\nu_3$ | Strong |
| | | | | 3609. | 2.77 | $2\nu_2+\nu_3$ | Medium |
| | | | | 3716. | 2.69 | $\nu_1+\nu_3$ | Medium |
| $N_2O$ | 588.8 | 17.0 | $\nu_2$ | 1285.0 | 7.78 | $\nu_1$ | Strong |
| | | | | 2223.5 | 4.50 | $\nu_3$ | Strong |
| $CS_2$ | 396.7 | 25.2 | $\nu_2$ | 1523. | 6.57 | $\nu_3$ | Strong |
| HCN | 712. | 14.0 | $\nu_2$ | 1412. | 7.08 | $2\nu_2$ | Strong |
| | | | | 2800. | 3.57 | $\nu_1+\nu_2$ | Medium |
| | | | | 3312. | 3.02 | $\nu_3$ | Medium |
| HDS | 1090. | 9.17 | $\nu_2$ | 2109. | 4.75 | $2\nu_2$ | Medium |
| | | | | 2684. | 3.73 | $\nu_3$ | Strong |
| $D_2S$ | 934. | 10.7 | $\nu_2$ | 1999. | 5.00 | $\nu_3$ | Strong |
| $NO_2$ | 648. | 15.4 | $\nu_2$ | 1621. | 6.17 | $\nu_3$ | Strong |
| $O_3$ | 710. | 14.1 | $\nu_2$ | 1043.4 | 9.58 | $\nu_1$ | Strong |
| | | | | 1740. | 5.75 | $\nu_3$ | Weak |
| $C_2H_2$ | 729.1 | 13.7 | $\nu_5$ | 3287. | 3.04 | $\nu_3$ | Strong |
| | | | | 1328. | 7.53 | $\nu_4+\nu_5$ | Medium |
| $C_2D_2$ | 539.1 | 18.5 | $\nu_5$ | 1044. | 9.58 | $\nu_4+\nu_5$ | Weak |
| | | | | 2427. | 4.12 | $\nu_3$ | Strong |
| $C_2HD$ | 518.8 | 19.3 | $\nu_4$ | 1851.2 | 5.40 | $\nu_2$ | Medium |
| | 683. | 14.6 | $\nu_5$ | 2584. | 3.87 | $\nu_3$ | Strong |
| | | | | 3334.8 | 3.00 | $\nu_1$ | Strong |
| $C_2N_2$ | 226. | 44.2 | $\nu_5$ | 732. | 13.7 | $\nu_4+\nu_5$ | Strong |
| | | | | 2149. | 4.65 | $\nu_3$ | Strong |
| $B^{10}F_3$ | 482.0 | 20.7 | $\nu_4$ | 1497. | 6.68 | $\nu_3$ | Strong |
| | 719.5 | 13.9 | $\nu_2$ | | | | |
| $CD_4$ | 995.6 | 10.0 | $\nu_4$ | 2258.2 | 4.43 | $\nu_3$ | Strong |
| $CH_3Cl$ | 732.1 | 13.6 | $\nu_3$ | 1015. | 9.58 | $\nu_6$ | Medium |
| | | | | 1354.9 | 7.38 | $\nu_2$ | Strong |
| | | | | 1454.6 | 6.87 | $\nu_5$ | Medium |
| | | | | 2966.2 | 3.37 | $\nu_1$ | V. Strong |
| | | | | 3041.8 | 3.29 | $\nu_4$ | Medium |
| $CH_3Br$ | 611. | 16.4 | $\nu_3$ | 952. | 10.5 | $\nu_6$ | Medium |
| | | | | 1305. | 7.66 | $\nu_2$ | Strong |
| | | | | 1445. | 6.92 | $\nu_5$ | Medium |
| | | | | 2972.0 | 3.36 | $\nu_1$ | V. Strong |
| | | | | 3055.9 | 3.27 | $\nu_4$ | Medium |
| $CH_2Cl_2$ (Methylene Chloride) | 704. | 14.2 | $\nu_3$ | 1155. | 8.66 | $\nu_5$ | Weak |
| | 737. | 13.6 | $\nu_9$ | 1266. | 7.90 | $\nu_8$ | V. Strong |
| | 899. | 11.1 | $\nu_7$ | 1429. | 7.00 | $\nu_2$ | Strong |
| $CH_3C \equiv CH$ Methyl Acetylene | 643. | 15.6 | $\nu_9$ | 926. | 10.8 | $\nu_5$ | Strong |
| | | | | 1041. | 9.6 | $\nu_8$ | Weak |
| | | | | 2994. | 3.34 | $\nu_6$ | V. Strong |
| | | | | 3429. | 2.92 | $\nu_1$ | Strong |

An alternative system is illustrated in FIG. 6 and consists of parallel gas dynamic laser (GDL) nozzles where the stagnation temperature (T) and pressures (P) for each nozzle are adjusted to provide the desired supersonic flow characteristics. Medium $CO_2$ in one nozzle at $T_o$, $P_p$, $\nu_o$ is the working laser medium which is irradiated before equilibrium by depumping radiation from the $CO_2$ medium in the other nozzle at $T_1$, $P_1$, $\nu_1$. A reflector $M_3$ directs depumping radiation downward as indicated by the arrow. The optical resonator, not shown, (composed of mirrors or reflectors similar to $M_1$ and $M_2$ in FIG. 5) at $\lambda=16$ is placed perpendicular to the plane of the paper in the laser medium.

Each of the illustrated and/or described systems can be numerically evaluated since the $01^10 - 00^00$ equilibration time is known as a function of temperature, and the required optical transition strengths are available for $CO_2$.

Again, it is pointed out that while the description has been primarily directed to $CO_2$ as the gaseous lasing medium, use of other mediums such as $UF_6$ and $SF_6$ and those set forth in Table I, are within the scope of this invention. For example, with $SF_6$, where the lower level can be depumped with a $CO_2$ laser, the second level is thermally populated for laser action at room temperature.

While the invention has been described with respect to $16\mu$ frequencies, the advantage of the method is that it provides an ability to achieve laser radiation at many frequencies ($10-30\mu$) at which no other lasers are presently available.

It has thus been shown that the present invention provides a fundamentally different method of achieving laser action, that being, by optically depumping lower energy levels rather than increasing the upper energy levels as previously done. Thus, this invention provides a substantial advance in the gas laser art.

While particular parameters and means for carrying out the invention have been illustrated and described, modifications will become apparent to those skilled in the art, and it is intended to cover in the appended claims all such modifications as come within the spirit and scope of the invention.

What is claimed is:

1. A method for obtaining laser action in a gaseous lasing medium contained in a resonant cavity, between an upper energy level and a lower energy level of the medium comprising the steps of: populating the upper level to a degree short of achieving an inverted population, and establishing an inverted population by transiently and selectively depumping the lower level, and stimulating the emission between the upper and lower energy levels of a laser beam via said resonant cavity.

2. The method defined in claim 1, wherein the step of depumping the lower level is carried out by exposing the medium to an intense source of radiation which selectively causes the transformation of the lower level species to some other energy level.

3. The method defined in claim 1, wherein the populating of the upper level is carried out by exposing the medium to energy produced by an energy source selected from the group consisting of flash lamps, electron beams, and electrical discharges.

4. The method defined in claim 1, wherein the step of populating the upper level of the gaseous medium is carried out by utilizing a gaseous medium selected from polyatomic molecules and polar molecular species and having low-lying vibrational energy levels close to the ground state, and by elevating the temperature of the medium.

5. The method defined in claim 4, wherein the step of depumping the lower level is carried out by rapidly pumping the molecules in the ground state to a higher energy level.

6. The method defined in claim 1, wherein the step of populating the upper level of the gaseous medium is carried out by utilizing $SF_6$ as the gaseous medium and maintain same at room temperature, and wherein the step of depumping the lower level is carried out by exposing the medium to radiation from a $CO_2$ laser.

7. The method defined in claim 1, wherein the gaseous lasing medium is $CO_2$, wherein the step of populating the upper level of the $CO_2$ is carried out by heating the $CO_2$ to an equilibrium temperature; and wherein the step of depumping the lower level is carried out by directing energy from an intense spectral source through the heated $CO_2$.

8. The method defined in claim 7, wherein the step of directing energy from an intense spectral source through the heated $CO_2$ is carried out by activating a flash lamp positioned adjacent the resonant cavity within which the $CO_2$ is contained.

9. The method defined in claim 1, additionally includes the step of directing the gaseous medium through parallel gas dynamic laser nozzles wherein the stagnation and pressures for each nozzle are adjusted to provide different supersonic flow characteristics, wherein the step of populating the upper level of the gaseous medium directed through one nozzle is carried out by irradiating same before equilibrium by depumping radiation from the gaseous medium directed through another nozzle, and wherein the step of depumping is carried out by a reflector which directs depumping radiation through the medium.

* * * * *